July 8, 1947. K. RATH 2,423,617
CONTINUOUS BALANCE MOTOR CONTROL SYSTEM
Filed Feb. 19, 1944 4 Sheets-Sheet 1

INVENTOR.

INVENTOR.

Patented July 8, 1947

2,423,617

UNITED STATES PATENT OFFICE 2,423,617

CONTINUOUS BALANCE MOTOR CONTROL SYSTEM

Karl Rath, New York, N. Y., assignor to Radio Patents Corporation, New York, N. Y., a corporation of New York Application February 19, 1944, Serial No. 523,027

8 Claims. (Cl. 172—239)

1

My invention relates to continuous balance translating systems known as self-balancing potentiometers and other follow-up devices for operating an indicator, recorder, control device or the like in accordance with relatively small changes of a variable input magnitude or condition.

Known arrangements of this type comprise essentially a balanced Wheatstone bridge system adapted to be unbalanced by an initial deflection of a sensitive galvanometer to produce an off-balance output current serving to control an electric motor operating a recorder or other control device. The motor at the same time produces a varying compensating voltage for neutralizing or balancing the galvanometer exciting voltage to restore and maintain the balance of the system. As a result of the self-balancing action, the movement of the output device follows the variations of the input element continuously and substantially without the effect of the intermediary translating elements, amplifiers, etc. on the fidelity of input-output characteristic of the system.

An object of the present invention is to provide a system of this type requiring a minimum of parts and elements both electrical and mechanical, while insuring extreme sensitivity and stability of operation.

Another object is to provide a translating system of this character capable of operating a comparatively high power electrical motor controlling a suitable output device responsive to movements or variations of a relatively simple and delicate basic or pilot element controlled either manually or in accordance with an electric current, temperature, pressure or any other variable magnitude or condition to be translated.

With these and further objects in view, which will become more apparent as the following description proceeds, the invention involves essentially the use of a frequency balancing system and other features of improvement in connection with potentiometric or follow-up control devices of the general type outlined above.

In my co-pending applications, Serial No. 519,003, filed January 20, 1944, entitled "Electrical apparatus" and Serial No. 520,635, filed February 1, 1944, entitled "Balanced potentiometric translating system," I have described frequency balancing circuits in connection with follow-up type control devices of relatively low power output, in particular an electro-magnetic indicator or recorder. The present invention

2 provides a system of this general character suitable for operating a high power output device such as an electric motor controlling an indicator, recorder or the like.

The above and further objects and aspects of the invention will become more apparent from the following detailed description taken in reference to the accompanying drawings forming part of this specification and wherein:

Figures 5 and 6 illustrate further embodiments of self-balancing potentiometer systems utilizing various frequency balancing circuits and including other features of improvement according to the invention.

Like reference numerals identify like parts throughout the different views of the drawings.

Figure 1:
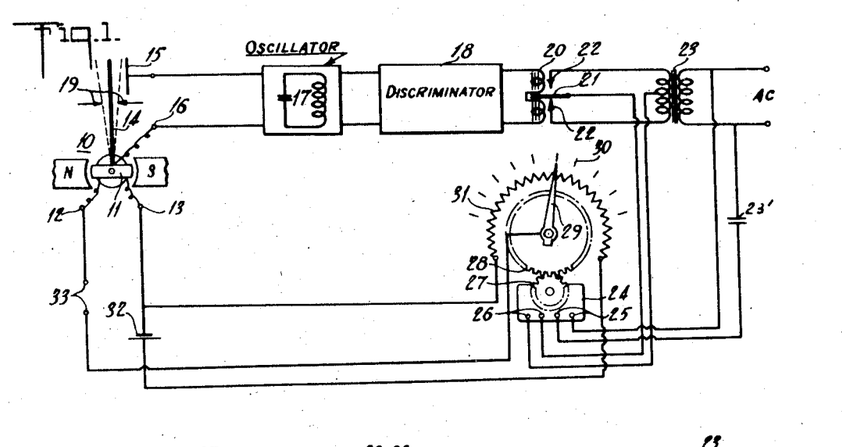
Figure 1 is a schematic diagram of a continuous balance or self-balancing potentiometer embodying the principles of the invention.

Referring more particularly to Figure 1, I have shown a primary or basic element 10 in the form of a sensitive galvanometer comprising a moving coil 11 mounted between magnet poles N and S and having terminals 12 and 13 connected to the coil winding through flexible leads such as a pair of balance or torque springs as is customary in the usual construction of instruments of this type.

Moving coil 11 carries a pointer or movable member 14 having an enlarged end acting as an electrode and arranged to cooperate with a fixed electrode 15 to form a variable electrical condenser. In order to effect electric connection to the electrode or pointer 14, the latter may be connected to a further fixed terminal 16 through a flexible conductor in a manner well understood. The variable condenser formed by the elements 14 and 15 is effectively connected to the tank circuit 17 of a high frequency oscillator, whereby to vary the oscillating frequency as a result of a deflection of the galvanometer from its normal or zero position as shown in full and dotted lines in the drawing. Thus, assuming the oscillator to generate a given frequency determined by the resonant frequency of the tank circuit 17, a deflection of the galvanometer in one sense will result in an increase and deflection in the opposite sense will result in a decrease of the capacity of the condenser 14—15, whereby to cause a corresponding decrease or increase, respectively, of the oscillating frequency from its normal or center frequency determined by the resonant frequency of the circuit 17.

The deflection of the pointer or movable electrode 14 is limited in either sense to a relatively small angle determined by suitable stops indicated at 19. In other words, the galvonometer is utilized merely to register an initial deviation from its normal or center position without requiring any full scale deflection. This results in substantial simplification of the construction as well as operation of the galvanometer or other basic or pilot instrument used.

Figure 2:
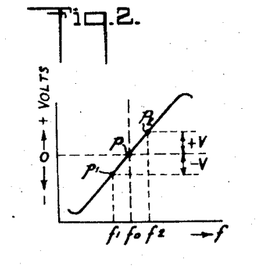
Figure 2 is a graph explanatory of the function and operation of the invention.

The oscillating frequency deviations are converted into corresponding variations of an electric current by means of a discriminator or frequency detector 18 having an operating characteristic of the general type as shown in Figure 2. In the latter, the discriminator output volts are plotted as a function of the input frequency and it is seen that for the normal or center frequency $f_0$ corresponding to the normal or unmodulated oscillating frequency, the output voltage of the discriminator is zero and increases linearly in either direction to a value $+V$ or $-V$ corresponding to an increase or decrease of the oscillating frequency to values $f_2$ and $f_1$, respectively, as a result of a corresponding galvanometer deflection. By the proper choice and design of the discriminator characteristic, considerable output voltage changes or an extreme slope of the operating characteristic within the points $P_1$ and $P_2$ may be obtained, resulting in an extreme sensitivity and a relatively high output voltage for minute deviations of the oscillating frequency or deflection of the galvanometer.

The discriminator output voltage serves to energize the winding 20 of a differential or polarized relay of known design having an armature 21 and cooperating contacts 22. The latter are connected to the secondary terminals of a transformer 23 having its primary connected both to an A. C. supply source and to the terminals 25 of one phase winding of a two-phase electric motor 24. The other phase winding of the motor having terminals 26, is connected to the center tap of the secondary winding of the transformer 23 and to the armature 21 of the relay. In order to obtain a two-phase current to operate the motor 24 from the single phase power supply shown, the supply leads to one of the phase windings include a condenser 23' as a phase shift element. This and other details are common and well known in the art.

In a system of the type described, an initial deflection of the galvanometer in one direction and corresponding change of the operating frequency will result in the relay armature 21 closing one of the contacts 22, and vice-versa, a deflection of the galvanometer in the opposite direction will result in a closing of the opposite relay contact 22, whereby to connect oppositely phased voltages supplied by the center-tapped sections of the secondary of the transformer 23, to the rotor winding of the motor 24 and to cause the latter to start rotation in either direction depending on the sense of deflection of the galvanometer from its normal or zero position.

Motor 24 drives a contactor or pointer 29 or any other movable member by way of a pair of gears 27 and 28. Pointer 29 may be associated with a dial carrying a scale 30 calibrated in input units to be indicated or may be connected with a suitable recording pen for directly recording the deflections of the galvanometer. Alternatively, the motor may serve to control any other output device to be operated in accordance with a variable input magnitude or condition. In addition, the pointer or other member controlled by the motor 24 serves to operate a potentiometric resistance 31 associated with a source of fixed electric potential such as a dry battery 32 and serving to compensate the input voltage or potential impressed upon the galvanometer by way of input terminals 33. This input voltage may be supplied by any source of weak electric power such as a thermo-electric element, photovoltaic cell and the like. In the latter case, where the input voltages available are of the order of a fraction or several micro-volts, the resistance 31 may assume the form of a slide wire in series with one or more fixed resistances and arranged to cooperate with a slide contact carried by the pointer or equivalent movable element 29. The function and operation of the system shown in Figure 1 will be further understood from the following.

Let it be assumed that the voltage supplied by the potentiometer 31 in the position shown has a value corresponding to and balancing a predetermined input voltage applied to the terminals 33. In this case, the current through the galvanometer winding 11 will be zero and the movable member or electrode 14 will be at rest or the full line position shown. If now the input voltage applied to the terminals 33 increases, an electric current will pass through the galvanometer winding in a definite direction and in proportion to the differential between the input voltage and the voltage supplied by the potentiometer 31. Accordingly, the galvanometer will be deflected to one of the positions shown in dotted lines, whereby to cause the relay armature to be attracted towards one of the contacts 22. This will result in a rotation of the motor 24 in a corresponding direction in the manner described in the foregoing. Consequently, the potentiometer voltage will be decreased until again balancing the input voltage so as to cause the galvanometer to return to its rest or zero position and to stop the motor rotation.

If the input voltage applied to the terminal 33 decreases below the potentiometer voltage, the galvanometer will be deflected in the opposite direction, resulting in an attraction of the relay armature 21 towards the other contact 22 and rotation of the motor 24 in the opposite direction. Consequently, the potentiometer voltage in this case will be decreased until the input voltage is again balanced and both the galvanometer and motor returned to resting position. As a result of this self-balancing or follow-up relation between the input voltage and the motor 24, the latter will follow the relatively weak changes of the input voltage or other magnitude causing the deflection or movement of the member 14.

Figure 3:
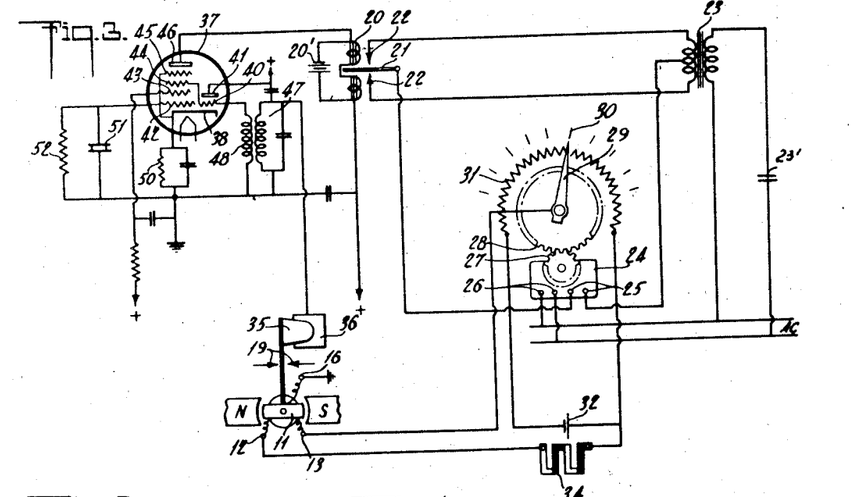
Figure 3 is a detailed circuit diagram illustrating a self-balancing potentiometer system according to the invention.

A complete circuit diagram of a self-balancing potentiometer system according to the invention is shown in Figure 3. This embodiment comprises a composite triode-hexode vacuum tube 37 having a common cathode 38, a triode control grid 40, a triode plate 41 and a hexode section including a first control grid 42, a screen grid 43, a second control grid 44, a suppressor grid 45 and an anode or plate 46, all arranged substantially in the order named. The triode section of the tube is utilized to generate a high frequency oscillation by the provision of any suitable regenerative oscillator circuit comprising a plate tank circuit 47 and grid feedback coil 48 in the example illustrated. A condenser shunted resistance 50 in the common cathode return for the grid and plate circuit serves to provide suitable operating grid bias potenial in a manner well known. The second control grid 44 of the hexode section is directly internally connected to the grid 40 of the triode section, whereby to control the electron stream passing to the anode 46 in accordance with the oscillating frequency determined by the resonant frequency of the tank circuit 47. The inner control grid 42 of the hexode section is shown connected to ground through the piezo-electric crystal 51 shunted by a high impedance pervious to direct current such as a high ohmic resistance 52. In place of the piezo-electric crystal a resonant circuit either of the parallel-resonant or series-resonant type may be employed.

Figure 4:
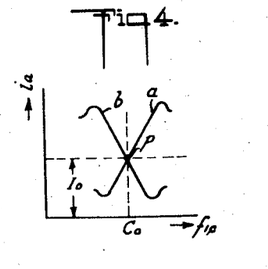
Figure 4 is a graph explanatory of the function of the frequency discriminator embodied in Figure 3.

The hexode section of the tube 37 connected in the manner described constitutes a frequency discriminator capable of producing a steady or average anode current $i_a$ varying in the manner shown by curve $a$ in Figure 4 as a function of the oscillating frequency $f$ or by curve $b$ as a function of the capacity $c$ of the oscillating or tank circuit 47. The function of this type of discriminator is due in a known manner to the effect of a concentrated space charge or virtual cathode adjacent to the grid 42 and resulting in an excitation of the crystal 47 at oscillating frequency and with a phase varying in dependence upon the deviation of the oscillating frequency from the fixed resonating frequency of the crystal. If the oscillating or the resonant frequency of the tank circuit 47 is equal to the resonating frequency of the crystal 51, corresponding to a tank circuit capacity $C_0$, the steady anode current $i_a$ passing through the relay winding 20 will have a normal value $I_0$ corresponding to the anode current if one of the control grids 42 or 44 were omitted or disconnected from the circuit, that is determined substantially by the steady operating and biasing potentials of the tube.

The oscillating frequency, as pointed out, is determined by the resonating frequency of the tank circuit 47, which latter may be varied by varying the tank circuit capacity $c$. For this purpose the pointer 14 of the galvanometer has attached to it an electrode 35 arranged to cooperate with a fixed electrode 36 to form a variable condenser element effectively connected across the tank circuit 47. In the normal or zero position of the galvanometer, the tank circuit 47 has a capacity $C_0$ corresponding to the normal oscillating frequency $f_0$ which, as pointed out, equals the resonating frequency of the crystal 51. If now the galvanometer is initially deflected in one direction, an increase of the tank circuit capacity will result in a decrease of the oscillating frequency and in turn an increase of the steady plate current through the galvanometer winding 20 as seen from Figure 4. Vice versa, a deflection of the galvanometer in the opposite direction will result in a decrease of the capacity of the tank circuit and corresponding increase of the oscillating frequency, resulting in a decrease of the steady plate current flowing through the relay winding 20. Since the crystal 51 has a very low damping coefficient, the operating characteristic has an extremely high slope, resulting in a substantial output current change in response to minute deflections of the galvanometer and in an extreme response sensitivity of the system.

In order to balance the normal current $I_0$ through the relay, a compensating battery 20' is shown connected in parallel to the relay winding. Alternatively, the normal current $I_0$ may be used in full or in part as pre-magnetizing or polarizing current of the relay, in which case its increase or decrease as a result of a frequency unbalance will cause a deflection of the armature 21 in opposite directions in a manner described and understood from the foregoing.

In a discriminator of the type shown in Figure 3, the crystal 51, as pointed out, may be replaced by a resonant discriminating circuit having a natural frequency equal to the normal oscillating frequency. In accordance with a modification, the condenser 35—36 associated with the galvanometer may be arranged to control the resonating frequency of this discriminating circuit in which case the operating frequency produced by the oscillator is kept constant. Thus, if a parallel resonant circuit is used in place of the crystal 51, the condenser 35—36 may be connected in parallel thereto, whereby to obtain a similar variation of the anode current $i_a$ as shown by the curve $a$ in Figure 4 as a function of the capacity of the condenser 35—36.

The operating characteristic shown in Figure 4 corresponds to the operation of the crystal 51 at its parallel-resonant frequency. If the crystal is used at series-resonant frequency, the curve will be of similar shape but reversed as to phase in respect to the capacity changes effected by the galvanometer, or in other words curve $a$ will represent the anode current in response to a capacity change of the tank circuit and curve $b$ will represent the anode current as a function of the oscillating frequency. By the proper polarization of the galvanometer winding, of the relay and of the motor, or any other elements of the system, it is possible to obtain the desired neutralizing or self-compensating effect between the potentiometer and input voltage. In Figure 3 there is indicated a thermo-electric element 34 as an input device, in which case the scale 30 may be directly calibrated in degrees of temperature.

Figure 5:
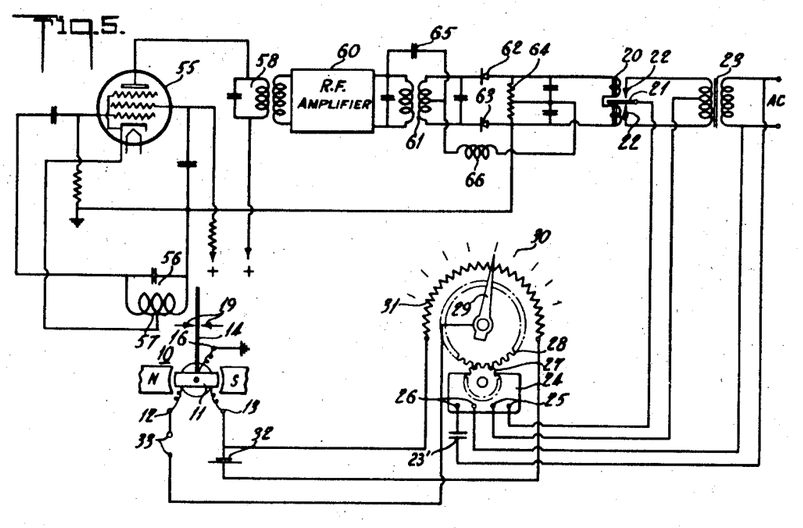

Referring to Figure 5, I have shown a modified system similar to Figure 3 wherein the deflection of the galvanometer serves to control the inductance 57 of an oscillator tank circuit 56 of an electron coupled oscillator tube 55 of well known type in the art. For this purpose, the end of the pointer 14 serves as a metallic screen arranged to move within the magnetic field of the tank circuit inductance 57, whereby to control the inductive reactance in a manner well known to those skilled in the art. For this purpose, pointer 14 may carry a highly conducting metal blade of copper or the like to obtain a maximum inductance change in a manner well understood. In other words, a deflection of the galvanometer in one direction will again result in an increase of the oscillating frequency and a deflection of the galvanometer in the opposite direction will result in a decrease of the oscillating frequency. The oscillations are applied by way of the resonant plate output circuit 58 to a stabilized R. F. amplifier 60 for amplification to a desired amplitude.

The amplified oscillations are then applied to the discriminator shown in Figure 5 as a known type of balanced phase-shift type discriminator and comprising a resonant transformer 61 having tuned input and output circuits and connected to a load resistor 64 through a pair of linear detectors 62 and 63, such as a pair of diode discharge devices. The center tap of the secondary transformer winding is connected on one hand to the high potential side of the primary winding by way of a coupling condenser 65 and on the other hand to the center of the load resistance 64 by way of an impedance such as a choke coil 66.

The function and operation of this discriminator is well known being based on the variable phase shift between the primary and secondary voltages of the transformer 61 depending upon the deviation of the impressed frequency from the fixed resonant frequency of the primary and secondary circuits. As a result, a differential rectified voltage varying substantially as shown in Figure 2 is obtained across the outer terminals of the load resistance 64 which in the example shown directly energizes the relay winding 20. The remainder of the circuit in Figure 5 is similar to the preceding circuits and the function and operation will be readily understood from the foregoing. An initial deviation of the galvanometer in one direction results in an oscillating frequency change and a discriminator output voltage in one direction, causing the motor to rotate and to restore the original balance position. Vice-versa, an initial deflection of the galvanometer in the opposite direction results in an oscillating frequency change in the opposite sense and corresponding discriminator output voltage and rotation of the motor in the opposite direction until again restoring the system to exact frequency balance.

Referring to Figure 6, I have shown a further modification of the invention utilizing a composite multi-grid oscillator-discriminator tube 68 comprising a tank circuit 69 regeneratively connected to the cathode, grid and screen grid in accordance with the well known Hartley type oscillator circuit and a piezo-electric crystal 70 shunted by a high ohmic resistance 71 and connected between the outer or second control grid and the cathode. In this manner the tube functions as an oscillator causing an initial variation of the electron stream passing to the anode in accordance with the oscillating frequency determined by the tank circuit 69 and controlled by the galvanometer deflection in a manner understood from the foregoing. In addition to the electron stream control by the oscillating frequency, the electron stream is further controlled at a varying relative phase by the action of the crystal 70 excited by space charge coupling with the electron stream in substantially the same manner as described in reference to Figure 3, to result in a variation of the steady anode current as shown by the curve $b$ in Figure 4.

The anode current is again utilized to energize the relay winding 20, the steady anode current $I_0$ through which is compensated by a battery 20' in series with a resistance 73 or may be utilized for polarizing the relay. The remaining parts and the operation of this system are substantially similar to the previously described arrangements and will be readily understood from the above.

In all the previous arrangements the motor operated by the off-balance output current serves to operate a potentiometer producing a neutralizing or balancing voltage in opposition to the input control voltage energizing the primary element or galvanometer. According to a modification of the invention, the frequency balance by the output motor is restored and maintained by controlling a frequency determining element of either the oscillator or discriminator in such a manner as to balance an initial frequency deviation and to restore and maintain a continuous frequency balance.

Figure 7:
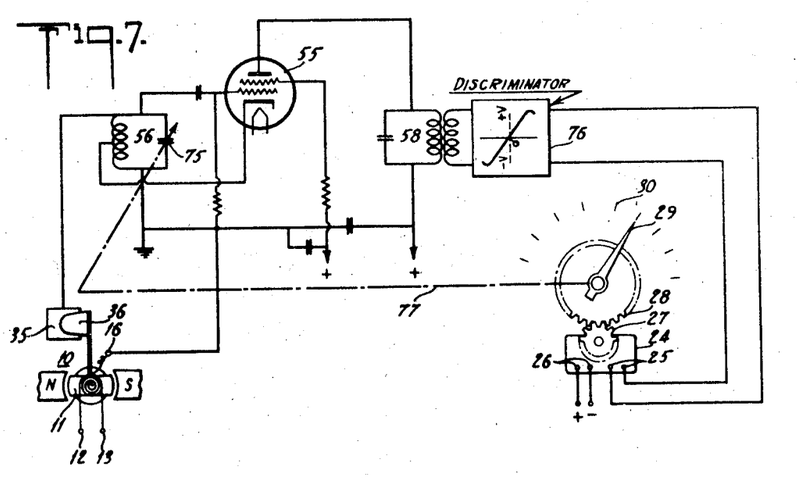
Figure 7 shows a follow-up type control system according to the invention utilizing mechanical means for restoring and maintaining the frequency balance.

An arrangement of this type is shown in Figure 7. In the latter, the oscillator 55 is similar to that shown in Figure 5 and comprises a tank circuit 56 including a variable condenser 75 for controlling the oscillating frequency in addition to the frequency control effected by the variable condenser 35—36 associated with the galvanometer 10. The discriminator 76 shown schematically may be of any type known in the art. The motor 24 is of the direct current type in which case terminals 26 representing the field winding are connected to a D. C. source of fixed voltage and terminals 25 represent the armature winding directly energized from the output of the discriminator 76. Since the direction of rotation of the motor depends on the direction of the armature field, the motor will again be started in a different direction depending on the frequency deviation or polarity of the discriminator output voltage as is understood.

In order to restore the frequency balance, the motor is coupled mechanically with the variable condenser 75, which latter may be of the rotary plate type, by way of a suitable coupling connection schematically indicated at 77. In this manner, initial deflection of the galvanometer in a certain direction and consequent starting of the motor rotation will result in a corresponding change of the capacity of condenser 75 in such a manner as to restore the original frequency balance. In this case, it is understood that the galvanometer will be deflected over its full operating range in proportion to the exciting currents and that the pointer 29 or other element operated by the motor will follow the galvanometer movement in a continuously balanced follow-up relation.

Figure 8:
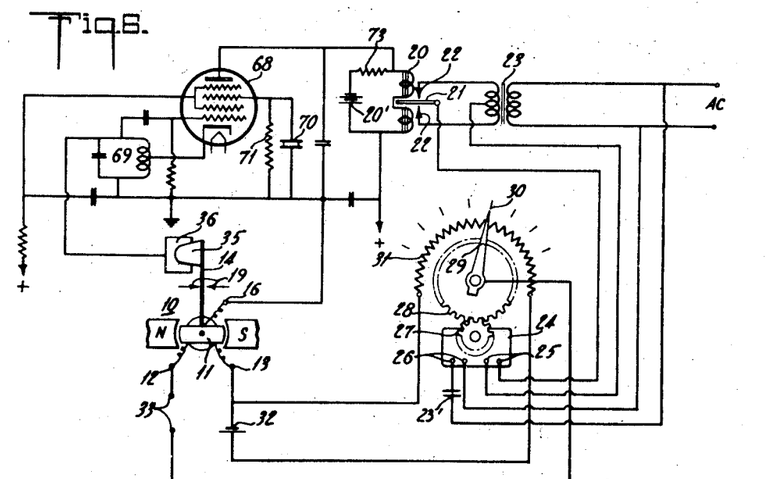
Figure 8 illustrates a modification of a system shown in Figure 7.

Referring to Figure 8 there is shown a system similar to Figure 7, wherein the frequency balance is effected in the discriminator by using a special type of discriminator circuit embodying a resonant circuit of variable frequency directly controlled by the motor. This discriminator is of similar type to that shown in Figure 3 and comprises a multi-electrode tube 81 having a first or inner control grid 82 connected to the cathode through a resonant circuit taking the place of the crystal 51 in Figure 3 and comprising an induction coil 85 and variable condenser 86. The latter is mechanically coupled with the motor control by way of a coupling connection indicated at 87. The tube 81 has a further control grid 83 separated from the control grid 82 by a screen grid 84 and excited in accordance with the oscillating frequency supplied by the oscillator 55. The discriminator output current varies in the manner shown by curve $a$ in Figure 4 as a function of either the oscillating frequency or the capacity of the condenser 86, and serves to control the armature winding of the motor 24. Item 88 represents an anode battery and 90 is a compensating battery to neutralize the normal or steady output current. There is furthermore shown in Figure 8 a modification of the invention as applied to a mechanical control of the input or oscillating frequency produced by the oscillator 55. For this purpose the oscillating tank circuit comprises an inductance 80 shunted by a manually or otherwise controlled condenser having a fixed electrode 91 and a movable electrode 92 provided with an adjusting knob 93 and an adjusting scale 94. In this manner a control of the capacitor may be translated into proportionate movement of the output motor and associated control device, whereby to make it possible to effect a control of a relatively large motor or other output device by a relatively simple and light movement or control.

According to a further modification of the invention, the frequency balance may be restored and maintained electrically by the employment of a suitable reactance element associated with either the oscillator or discriminator and whose reactance may be adjusted in response to a variable electric current or potential, such as a premagnetized iron-core inductance having an auxiliary magnetization winding or an electronic reactance control tube. When using a reactance of this type, the control current or potential is adjusted by the rotation of the motor until restoring the frequency balance in a manner understood from the foregoing.

Figure 9:
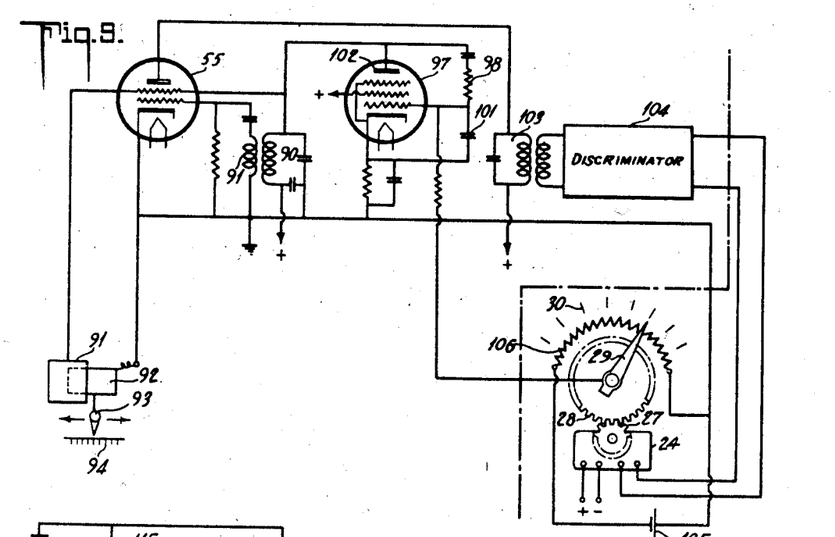
Figures 9 and 10 illustrate still further embodiments employing a modified frequency balancing system according to the invention.

A system of this type utilizing an electronic reactance control tube associated with the oscillator is shown in Figure 9. In the latter, there is shown an electron coupled oscillator having a tank circuit 90 connected to the screen grid and cathode of the tube 55 and reactively coupled with the control grid by way of a feedback coil 91 to generate sustained oscillations in a manner well understood. There is furthermore shown a variable condenser 91—92 similar to that of Figure 7 but which, as is understood, may be replaced by a galvanometer or other instrument providing a variable input reactance connected to the tank circuit for controlling the oscillating frequency.

The oscillating frequency is furthermore controlled by the provision of an electronic reactance tube 97 also shunted across the tank circuit 90 and excited by a quadrature potential derived from the tank circuit by means of a phase shift network comprising a resistance 98 and condenser 101 in series. Accordingly, a variable virtual reactance determinative of the oscillating frequency will be reflected upon the tank circuit 90 depending upon the internal impedance of the tube 97 which is controlled by a variable bias potential applied to its input control grid. This bias potential is supplied from a suitable source, such as a battery 105, in conjunction with an adjustable potentiometer 106 controlled by the motor 24 in a manner readily understood from the foregoing. The oscillations are applied to the discriminator 104 of any type by way of the tuned circuit 103 in the anode circuit of the tube to produce an output current for directly operating the D. C. motor 24 in a manner similar as described hereinbefore.

Thus, again, any frequency unbalance due to an initial variation of the input capacity by the displacement of element 92 will be counteracted and compensated by the bias control of the reactance tube 97, provided a proper choice and design of the circuit constants and polarization of the various elements of the system. This method of electrically maintaining the frequency balance has the advantage over mechanically balanced systems such as shown in Figures 7 and 8, that the motor 24 and associate control device may be located at a place remote from the basic control element as indicated by the dot-dash line in the drawing, whereby the connecting lines have to carry only direct currents and the problem of high frequency transmission over long lines is substantially avoided.

Figure 10:
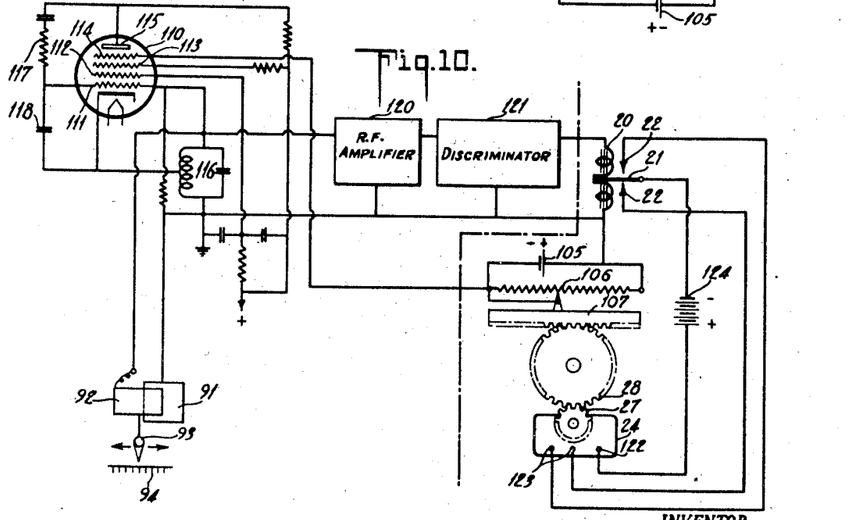

Referring to Figure 10, I have shown an arrangement similar to Figure 9, embodying a composite oscillator and reactance control tube of special type. This tube marked 110 comprises a cathode, a first control grid 111, a first screen grid 112, a second screen grid 113, a second control grid 114 and an anode 115, all arranged substantially in the order named. The control grid 111 and screen grid 113 are connected with a suitable self-oscillating circuit comprising a tank circuit 116 to generate an operating frequency controlled by the adjustment of the input condenser 91—92 in a manner understood from the foregoing. A portion of the plate output current is fed back upon the grid 111 through a quadrature phase shift network comprising a resistance 117 and condenser 118 in series.

In this manner, the feedback potential upon the grid 111 will be phase shifted by 90° to result in a virtual reactance reflected upon the tank circuit 116. The value of this reactance determining the oscillating frequency is adjusted by controlling the electron current to the plate 115 by a suitable bias potential applied to the control grid 114. This bias potential is again supplied by a battery 105 and adjustable potentiometer 106, the latter being controlled by the output member 107 shown in the form of a rack cooperating with the gear 28. I have furthermore shown a R. F. amplifier 120 connected between the oscillator and discriminator 121 to obtain sufficient output current for operating a polarized relay similar to that shown in some of the preceding modifications.

In the example shown, the output current of the discriminator serves to excite a polarized relay which in turn controls the operation of the motor 24. The latter is shown to be of the special type having a first terminal 121 and a pair of cooperating terminals 123 connected to separate direct and reverse windings for causing rotation in opposite directions. Terminal 122 is connected to one pole of a suitable D. C. source such as a battery 124, while either of the direct or reverse terminals 123 is connected to the opposite pole of the source depending on the position of the relay armature 21 to initiate rotation of the motor in either directions in a manner readily understood from the foregoing.

It will be evident that the invention is not limited to the specific details and circuits as well as arrangements of parts shown and disclosed herein for illustration, but that the underlying principle and novel thought thereof will be susceptible of numerous variations and modifications coming within the broader scope and spirit of the invention as defined in the appended claims. The specification and drawings are accordingly to be regarded in an illustrative rather than in a limiting sense.

I claim:

1. An electrical system comprising a primary element supplying a relatively weak variable direct current input voltage; a secondary element having a movable member; an electric motor for driving said secondary element; a frequency converter-amplifier comprising a single resonant impedance means, a source of auxiliary high frequency voltage having a frequency normally equal to the resonant frequency of said impedance means, coupling means between said resonant impedance means and said source to develop a secondary high frequency voltage by said impedance means having a phase normally at 90° with respect to the phase of said source voltage and varying in sense and magnitude in proportion to the relative frequency departure between said source voltage and the resonant frequency of said impedance means, and further means for combining said secondary high frequency voltage with said source voltage to produce a direct current having an amplitude varying in sense and magnitude according to said frequency departure; means for controlling said motor by said output current to cause a rotation thereof in either direction in dependence upon the sense of said output current; a current responsive device connected to said primary element having means operatively associated therewith for effecting a relative frequency departure between said source and the resonant frequency of said impedance means; a source of constant direct current potential; and an adjustable resistance controlled by said motor; said resistance being connected to said source and in series with said primary element to produce a balancing voltage in opposition to said input voltage, whereby to automatically restore the frequency balance between said source and said resonant impedance means and to maintain a condition of electrical equilibrium between said input voltage and said balancing voltage.

2. An electrical system comprising a primary element supplying a relatively weak variable direct current input voltage; a secondary element having a movable member; an electric motor for driving said secondary element; a frequency converter-amplifier comprising a single resonant impedance means, a source of auxiliary high frequency voltage having a frequency normally equal to the resonant frequency of said impedance means, coupling means between said resonant impedance means and said source to develop a secondary high frequency voltage by said impedance means having a phase normally at 90° with respect to the phase of said source voltage and varying in sense and magnitude in proportion to the relative frequency departure between said source and the resonant frequency of said impedance means, and further means for combining said secondary high frequency voltage with said source voltage to produce a direct current having an amplitude varying in sense and magnitude according to said frequency departure; means for controlling said motor by said output current to cause a rotation thereof in either direction in dependence upon the sense of said output current; a current responsive device connected to said primary element, a variable reactance element controlled by said device and connected to said source to effect a relative frequency departure between said source and the resonant frequency of said impedance means; a source of constant direct current potential; and an adjustable resistance controlled by said motor; said resistance being connectd to said source and in series with said primary element to produce a balancing voltage in opposition to said input voltage, whereby to automatically restore the frequency balance between said source and said resonant impedance means and to maintain a condition of electrical equilibrium between said input voltage and said balancing voltage.

3. An electrical system comprising a primary element supplying a relatively weak variable direct current input voltage; a secondary element having a movable member; an electric motor for driving said secondary element; a frequency converter-amplifier comprising a piezo-electric crystal, a source of auxiliary high frequency voltage having a frequency normally equal to the resonant frequency of said crystal, coupling means between said crystal and said source to develop a secondary high frequency voltage by said crystal having a phase normally at 90° with respect to said source of voltage and varying in sense and magnitude in proportion to the relative frequency departure between said source and the resonant frequency of said crystal, and further means for combining said secondary high frequency voltage with said source voltage to produce a direct current having an amplitude varying in sense and magnitude according to said frequency departure; means for controlling said motor by said output current to cause a rotation thereof in either direction in dependence upon the sense of said output current; a current responsive device connected to said primary element having means operatively associated therewith for effecting a relative frequency departure between said source and the resonant frequency of said crystal; a source of constant direct current potential; and an adjustable resistance controlled by said motor; said resistance being connected to said source and in series with said primary element to produce a balancing voltage in opposition to said input voltage, whereby to automatically restore the frequency balance between said source and said crystal and to maintain a condition of electrical equilibrium between said input voltage and said balancing voltage.

4. An electrical system comprising a primary element supplying a relatively weak variable direct current input voltage; a secondary element having a movable member; an electric motor for driving said secondary element; a frequency converter-amplifier comprising a first resonant impedance means, a source of auxiliary high frequency voltage including a second resonant impedance means having a resonant frequency determinative of the source frequency, coupling means between said first resonant impedance means and said source to develop a secondary high frequency voltage by said first impedance means having a phase normally at 90° with respect to the phase of said source voltage and varying in sense and magnitude and proportion to the relative frequency departure between said source and the resonant frequency of said first impedance means, and further means for combining said secondary high frequency voltage with said source voltage to produce a direct output current having an amplitude varying in sense and magnitude in accordance with said frequency departure; means for controlling said motor by said output current to cause a rotation thereof in either direction in dependence upon the sense of said output current; a current responsive device connected to said input element, a variable reactance element controlled by said device and connected to said second resonant impedance means to control the frequency of said source; a source of constant direct current potential; and an adjustable resistance controlled by said motor, said resistance connected to said source and in series with said primary element to produce a balancing voltage in opposition to said input voltage, whereby to automatically restore the frequency balance between the resonant frequencies of said first and second resonant impedance means and to maintain a condition of electrical equilibrium between said input voltage and said balancing voltage.

5. An electrical system comprising a primary element supplying a relatively weak variable direct current input voltage; a secondary element having a movable member; an electric motor driving said secondary element; a frequency converter-amplifier comprising an electronic tube having at least a cathode, an anode, a pair of control grids and a screen grid interposed between said control grids, a resonant impedance means connected between said cathode and one of said control grids, a source of auxiliary high frequency voltage having a frequency normally equal to the resonant frequency of said impedance means and connected between the other of said control grids and said cathode, for producing a direct anode current having an amplitude varying in sense and magnitude in proportion to the relative frequency departure between said source and the resonant frequency of said impedance means; means for controlling said motor in response to said anode current to cause rotation thereof in either direction in dependence upon the sense of variation of said anode current; a current responsive device connected to said primary element having means operatively associated therewith for effecting a relative frequency departure between said source and the resonant frequency of said impedance means; a source of constant direct current potential; and an adjustable resistance controlled by said motor; said resistance being connected to said source and in series with said primary element to produce a balancing voltage in opposition to said input voltage, whereby to automatically restore the frequency balance between said source and said resonant impedance means and to maintain a condition of electrical equilibrium between said input voltage and said balancing voltage.

6. An electrical system comprising a primary element supplying a relatively weak variable direct current input voltage; a secondary element having a movable member; an electric motor driving said secondary element; a frequency converter-amplifier comprising an electronic tube having at least a cathode, an anode, a pair of control grids and a screen grid interposed between said control grids, a resonant impedance means connected between said cathode and one of said control grids, a source of auxiliary high frequency voltage having a frequency normally equal to the resonant frequency of said impedance means and connected between the other of said control grids and said cathode, for producing a direct anode current having an amplitude varying in sense and magnitude in proportion to the relative frequency departure between said source and the resonant frequency of said impedance means; means for controlling said motor in response to said anode current to cause rotation thereof in either direction in dependence upon the sense of variation of said anode current; a current responsive device connected to said primary element, a variable reactance element controlled by said device and connected to said source to effect a relative frequency departure between said source and the resonant frequency of said impedance means; a source of constant direct current potential; and an adjustable resistance controlled by said motor; said resistance being connected to said source and in series with said primary element to produce a balancing voltage in opposition to said input voltage, whereby to automatically restore the frequency balance between said source and said resonant impedance means and to maintain a condition of electrical equilibrium between said input voltage and said balancing voltage.

7. An electrical system comprising a primary element supplying a relatively weak variable direct current input voltage; a secondary element having a movable member; an electric motor driving said secondary element; a frequency converter-amplifier comprising an electronic tube having at least a cathode, an anode, a pair of control grids and a screen grid interposed between said control grids, a piezo-electric crystal shunted by a high impedance pervious to direct current and connected between said cathode and one of said control grids, a source of auxiliary high frequency voltage having a frequency normally equal to the resonant frequency of said crystal and connected between the other of said control grids and said cathode, for producing a direct anode current having an amplitude varying in sense and magnitude in proportion to the relative frequency departure between said source and the resonant frequency of said crystal; means for controlling said motor in response to said anode current to cause rotation thereof in either direction in dependence upon the sense of variation of said anode current; a current responsive device connected to said primary element having means operatively associated therewith for effecting a relative frequency departure between said source and the resonant frequency of said crystal; a source of constant direct current potential; and an adjustable resistance controlled by said motor; said resistance being conected to said source and in series with said primary element to produce a balance voltage in opposition to said input voltage, whereby to automatically restore the frequency balance between said source and said crystal and to maintain a condition of electrical equilibrium between said input voltage and said balance voltage.

8. An electrical system comprising a primary element supplying a relatively weak variable direct current input voltage; a secondary element having a movable member; an electric motor driving said secondary element; a frequency converter-amplifier comprising an electronic tube having at least a cathode, an anode, a pair of control grids and a screen grid interposed between said control grids, a first resonant impedance means connected between said cathode and one of said control grids, a source of auxiliary high frequency voltage including a second resonant impedance means having a resonant frequency determinative of the source frequency and connected between the other of the said control grids and said cathode to produce a direct anode current having an amplitude varying in sense and magnitude in proportion to the relative frequency departure between said source and said first impedance means; means for controlling said motor in response to said anode current to cause rotation thereof in either direction in dependence upon the sense of variation of said anode current; a current responsive device connected to said input element and a variable reactance element actuated thereby and arranged to control the resonant frequency of said second impedance means; a source of constant direct current potential; and an adjustable resistance controlled by said motor, said resistance connected to said source and in series with said primary element to produce a balancing voltage in opposition to said input voltage, whereby to automatically restore the frequency balance between the resonant frequencies of said first and second resonant impedance means and to maintain a condition of electrical equilibrium between said input voltage and said balancing voltage.

KARL RATH.

REFERENCES CITED

The following references are of record in the file of this patent:

UNITED STATES PATENTS

| Number | Name | Date |
| --- | --- | --- |
| 2,105,598 | Hubbard | Jan. 18, 1938 |
| 2,165,510 | Rosene | July 11, 1939 |
| 2,320,996 | Alexandersson et al. | June 8, 1943 |
| 2,251,064 | Martin et al. | July 29, 1941 |
| 2,216,910 | Moseley | Aug. 16, 1935 |
| 2,303,654 | Newton | Dec. 1, 1942 |